W. P. Everdon.
Plow.

№ 74327      Patented Feb. 11, 1868.

Witnesses
Jas. H. Layman
J. E. McBowen

Inventor
W. P. Everdon
By Knight Bros.
Attys

United States Patent Office.

WILLIAM PERRY EVERDON, OF LEAVENWORTH, INDIANA.

Letters Patent No. 74,327, dated February 11, 1868.

IMPROVEMENT IN PLOUGHS.

*The Schedule referred to in these Letters Patent and making part of the same.*

TO WHOM IT MAY CONCERN:

Be it known that I, WILLIAM P. EVERDON, of Leavenworth, Crawford county, Indiana, have invented certain new and useful Improvements in Ploughs; and do hereby declare the following to be a full, clear, and exact description thereof, reference being had to the accompanying drawings, making part of this specification.

My invention consists in a device for subsoil ploughing of meadows in such a manner as to both under-drain the surface and to cover it with a coating of the subsoil, without serious disturbance of the sods. In the accompanying drawings—

Figure 1:
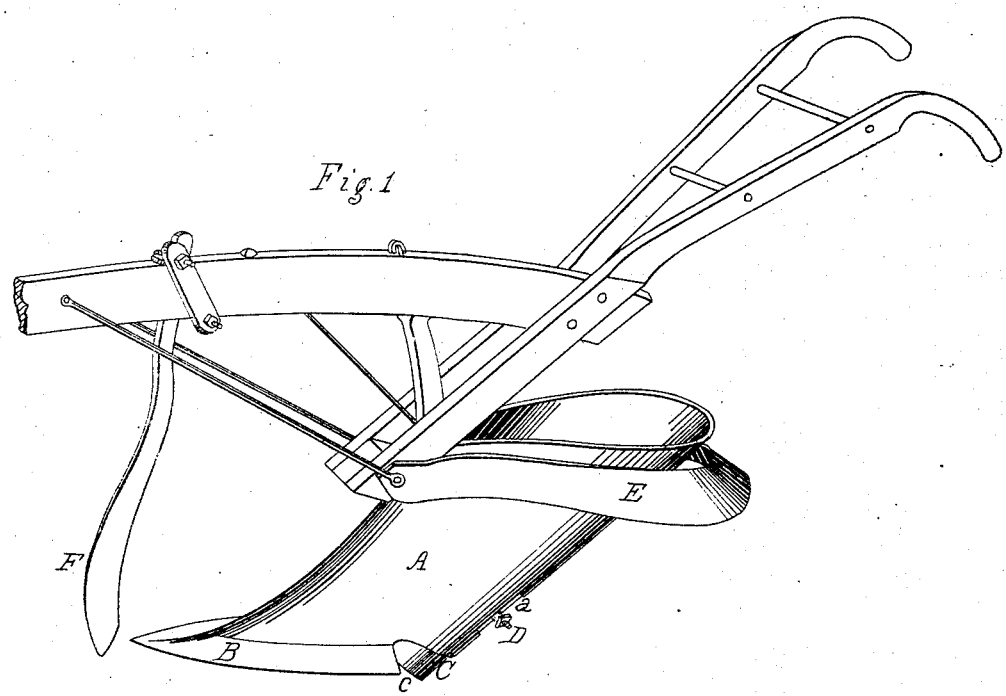
Figure 1 is a perspective view of a plough embodying my improvements.
Figure 2:
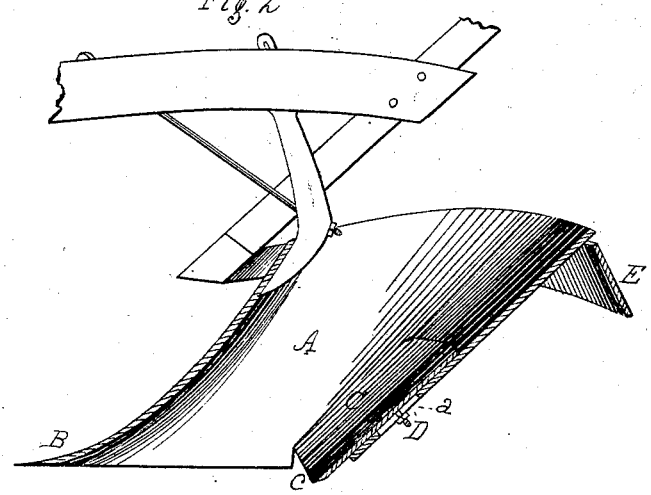
Figure 2 is a longitudinal section of the same.

The share consists of a hollow or tubular mould-board, A, having at its lower front side a sharp shovel or cutter, B, and at its lower rear side a scoop or excavator, C, whose sharpened lower edge, $c$, is so set as to penetrate the subsoil some three or four inches deeper than the share. The scoop is attached adjustably to the share by means of a screw-bolt D, traversing a slot, $a$, in the back of the share. Projecting externally and laterally downwards, from near the top of the tubular mould-board, is a deflecting-plate, flange, or guard, E, which, receiving the subsoil scatters the same thinly and uniformly over the sod. This flange also acts to press the sod evenly down and to restore the uniformity of its surface. Projecting downward from the beam, so as to precede the share, is a sharpened blade or coulter, F. It is also adapted to subsoil, cultivate, and drain all clay and loamy lands, loosen the ground without materially disturbing the even upper surface of the same, and without destroying the vitality of the roots, the plough penetrating beneath the surface, and at the same time loosening the earth without detaching or removing the sod; the plough being in tubular form throughout, down through which passes a bit, of semicircular shape, cutting two and one-half inches beneath the main cut of the plough. The subsoil is scooped up and passes up through the interior of the plough, and falling over the guard is scattered and pressed upon the sod. The sod is cut and loosened by the plough, the guard again pressing it back to its original position, and the dirt falling into the same guard which presses the sod down, is scattered evenly and thinly over the upper surface of the sod, thereby invigorating and increasing the growth of the latter, at the same time the land is being cultivated and subsoiled. The bit, passing down through the hollow or cylindrical post of the plough, cuts a three-inch drain, which carries off any superfluity of water that may be on the surface of the ground. The water reaches the drain through the loosened sod, and being carried off. At the same time the drain beneath the sod, which has been loosened, contains a sufficient amount of moisture to insure a quick and vigorous growth.

I claim herein as new, and of my invention—

1. The hollow ploughshare adapted to excavate, elevate, and scatter the subsoil without material disturbance of the surface, substantially as set forth.

2. The provision, upon the outside of a tubular plough, A, of the deflecting-plate or guard E, for the purpose explained.

3. The provision of the adjustable scoop or excavator C, at the rear lower portion of the tubular share A, for the object stated.

In testimony of which invention, I hereunto set my hand.

WILLIAM PERRY EVERDON.

Witnesses:
J. E. M. BOWEN,
JAMES H. LAYMAN.